(12) United States Patent
Zhang

(10) Patent No.: US 9,118,408 B2
(45) Date of Patent: Aug. 25, 2015

(54) METHODS AND APPARATUS FOR IMPROVING PERFORMANCE BASED ON FILTER CHARACTERISTICS

(71) Applicant: Apple Inc., Cupertino, CA (US)

(72) Inventor: Dawei Zhang, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 147 days.

(21) Appl. No.: 13/629,420

(22) Filed: Sep. 27, 2012

(65) Prior Publication Data

US 2013/0203457 A1    Aug. 8, 2013

Related U.S. Application Data

(60) Provisional application No. 61/594,958, filed on Feb. 3, 2012.

(51) Int. Cl.
*H04B 15/00* (2006.01)
*H04B 1/525* (2015.01)

(52) U.S. Cl.
CPC .............. *H04B 15/005* (2013.01); *H04B 1/525* (2013.01)

(58) Field of Classification Search
USPC ............. 455/423, 424, 447, 522, 63.1, 67.11, 455/69, 226.1, 62
See application file for complete search history.

(56) References Cited

U.S. PATENT DOCUMENTS

| | | | |
|---|---|---|---|
| 6,748,212 B2 * | 6/2004 | Schmutz et al. | ............... 455/424 |
| 6,965,788 B1 | 11/2005 | Barratt et al. | |
| 8,718,657 B2 * | 5/2014 | Naden et al. | .................. 455/447 |
| 2004/0219959 A1 | 11/2004 | Khayrallah | |
| 2009/0219863 A1 | 9/2009 | Sen et al. | |
| 2010/0118921 A1 | 5/2010 | Abdelmomnem et al. | |
| 2011/0256899 A1 | 10/2011 | Khazei et al. | |

FOREIGN PATENT DOCUMENTS

| | | |
|---|---|---|
| EP | 1 564 897 | 8/2005 |
| WO | 2011/153076 | 12/2011 |

* cited by examiner

*Primary Examiner* — Thanh Le

(74) *Attorney, Agent, or Firm* — Fay Kaplun & Marcin, LLP

(57) ABSTRACT

Methods and apparatus for improving operational and/or cost performance based on filter characteristics. Existing schemes for measuring filter performance are based on a worst case filter performance across a range of frequencies and temperature. Filter performance can be more accurately characterized over one or more frequency ranges. In one exemplary embodiment the frequency is characterized according to a functional (e.g., linear-average) metric. By providing more accurate representation of the reception/transmission filter performance, both network and device optimizations can aggressively manage available power and handle smaller (tighter) margins.

22 Claims, 3 Drawing Sheets

(12) United States Patent
US 9,118,408 B2

METHODS AND APPARATUS FOR IMPROVING PERFORMANCE BASED ON FILTER CHARACTERISTICS

PRIORITY APPLICATIONS

The present application claims priority to U.S. Provisional Patent Application Ser. No. 61/594,958 filed Feb. 3, 2012 and entitled "METHODS AND APPARATUS FOR IMPROVING PERFORMANCE BASED ON FILTER CHARACTERISTICS", the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of radio frequency (RF) components and component design. More particularly, disclosed embodiments are directed to improving device performance and cost implications based on filter characteristics.

2. Description of Related Technology

RF filters are configured to isolate, enhance, or block signals and noise in the megahertz (MHz) to gigahertz (GHz) frequency ranges. Filter performance is generally described in degrees of attenuation (according to a logarithmic decibel scale (dB)), insertion loss, bandwidth etc. For example, an "ideal" filter would provide perfect passing or reproduction of one or more desired frequency ranges, and perfect attenuation of frequencies outside of the desired frequency range(s). However, due to practical limitations imposed by the construction of filters, the desired frequency range(s) of an actual filter implementation will experience some degree of distortion, the frequencies outside of the desired frequency range cannot be completely rejected, and the filter will have a short transition (or "roll-off") frequency range that borders the desired frequency range.

Within the wireless arts, radio frequency (RF) transceiver performance is highly dependent upon filter components. Wireless reception/transmission is generally limited to one or more frequency bands, such as to comply with regulatory (FCC) or other requirements. During operation, wireless devices transmit and receive signaling over the one or more frequency bands. Proper filtering ensures that the wireless devices can remove unwanted noise from a received signal, or minimize leakage into other frequency bands from a transmitted signal. While it is generally appreciated that high quality filters maximize spectral efficiency, high quality filters are also very expensive, and their cost can increase disproportionately with quality (performance). Thus, for device manufacturing purposes, it is typically undesirable to "over optimize" filters.

Ideally, filter and filter component selection should consider the minimum performance requirements against overall device cost.

SUMMARY

The present disclosure provides apparatus and methods for improving device (e.g., wireless user device) performance based on radio frequency component (e.g., filter) characteristics.

A mobile radio communications apparatus is disclosed. In one embodiment, the mobile radio communications apparatus includes: at least one antenna; a radio transceiver having one or more radio frequency filters, the transceiver in signal communication with the at least one antenna; where the one or more radio frequency filters are characterized with one or more parameters corresponding to a range of frequencies; and processing apparatus in communication with the transceiver; wherein the transceiver is configured to adjust operation within a frequency band based at least in part on the characterized one or more parameters.

In one variant, the characterization of the one or more parameters corresponding to the range of frequencies includes an average rejection over the range of frequencies. In one such variant, the mobile radio communications apparatus is compliant with a Long Term Evolution (LTE) wireless standard, and the range of frequencies include a plurality of Resource Blocks (RBs).

In a third variant, the transceiver is configured to adjust operation dynamically according to the transmission bandwidth.

In a fourth variant, the transceiver is configured to adjust operation dynamically according to a monitored temperature.

In a fifth variant, the characterization of the one or more radio frequency filters is performed during manufacture.

In a sixth variant, the characterization of the one or more radio frequency filters is performed during a self calibration procedure.

A method for adaptively managing a component of a mobile wireless device is disclosed. In one embodiment, the method includes: characterizing one or more performance metrics of one or more radio frequency filter components within a frequency band, wherein: the frequency band includes a plurality of frequency bins; and individual ones of the one or more performance metrics are associated with respective individual ones of the plurality of frequency bins; determining a combined performance metric based at least in part on the characterized one or more performance metrics; and adjusting a transmit power based on the combined performance metric.

In one variant, the determining the combined performance metric includes determining a weighted average of the one or more performance metrics; and the weighted average is based on a plurality of static weights.

In other variants, the determining the combined performance metric includes determining a weighted average of the one or more performance metrics; and the weighted average is based on a plurality of static weights. In some implementations, the characterizing of the one or more performance metrics is additionally performed over a temperature range.

In a third variant, the one or more performance metrics include an efficacy of the one or more radio frequency filter components to reject unwanted frequencies. In some implementations, the efficacy is determined based at least in part on one or more of: (i) insertion loss; (ii) stop bandwidth; (iii) roll-off steepness; and (iv) stop band rejection. In other implementations, individual ones of the one or more performance metrics include out-of-band rejection values associated with respective individual ones of the plurality of frequency bins.

In a fourth variant, the characterizing the one or more performance metrics includes: determining a temperature of a transceiver of the mobile wireless device; and determining a shift of a filter bandwidth parameter associated with the temperature.

In a fifth variant, the combined performance metric includes a frequency linear average out-of-band rejection.

In a sixth variant, one or more performance metrics include one or more of (i) filter stop band rejection, (ii) transmit power; and/or (iii) filter bandwidth.

In a seventh variant, the combined performance metric includes any of (i) an average level of power loss measured over the frequency band, or (ii) a percentage of power loss.

In an eighth variant, the combined performance metric is based at least in part on one or more statistical parameters selected from the group consisting of: (i) a mean value; (ii) a standard deviation value; (iii) a median value; (iv) a percentile value; and (v) a least-squares regression coefficient.

A wireless device is disclosed. In one embodiment, the wireless device includes: a processing apparatus; a wireless transceiver in communication with the processing apparatus; and a computer readable apparatus in communication with the processing apparatus and having a plurality of computer readable instructions stored thereon, the instructions configured to, when executed on the processing apparatus, cause the processing apparatus to: characterize one or more performance metrics of one or more radio frequency filter components within a frequency band, wherein: the frequency band includes a plurality of frequency bins; and individual ones of the one or more performance metrics are associated with respective individual ones of the plurality of frequency bins.

A method of operating a base station in a long term evolution (LTE) cellular wireless communications network is disclosed. In one embodiment, the method includes: causing a mobile user device to obtain a current parameter value of a frequency band associated with the network; and based on the current parameter value, configuring one or more transceiver pass bands so as increase utilization of the frequency band by the mobile user device, while maintaining a minimum isolation performance from a transmission by another mobile user device associated with the network.

A wireless communication network base station apparatus is disclosed. In one embodiment, the base station apparatus includes: one or more processors; at least one wireless cellular interface; and logic in communication with the one or more processors and the wireless interface and configured to optimize bandwidth use within the network by first and second user equipment (UE) apparatus by at least: enabling the first UE to transmit a signal useful for evaluating a performance characteristic associated with the bandwidth use within the network; enabling the second UE to determine the performance characteristic based on receipt of the signal; and enabling the second UE to utilize an adjusted transmit power level based on the determined performance characteristic.

Computer readable apparatus are disclosed. In one embodiment, the computer readable apparatus stores a plurality of computer readable instructions configured to, when executed, cause a mobile wireless device to: characterize actual radio frequency filter performance; compare the actual radio frequency filter performance to a worst-case performance metric; and adjust a frequency bandwidth allocation based at least on the comparison; wherein the characterization includes determining a plurality of actual performance metrics associated with a plurality of frequency portions within a frequency bandwidth.

Other features and advantages disclosed hereinafter will immediately be recognized by persons of ordinary skill in the art with reference to the attached drawings and detailed description of exemplary embodiments as given below.

Figure 1:
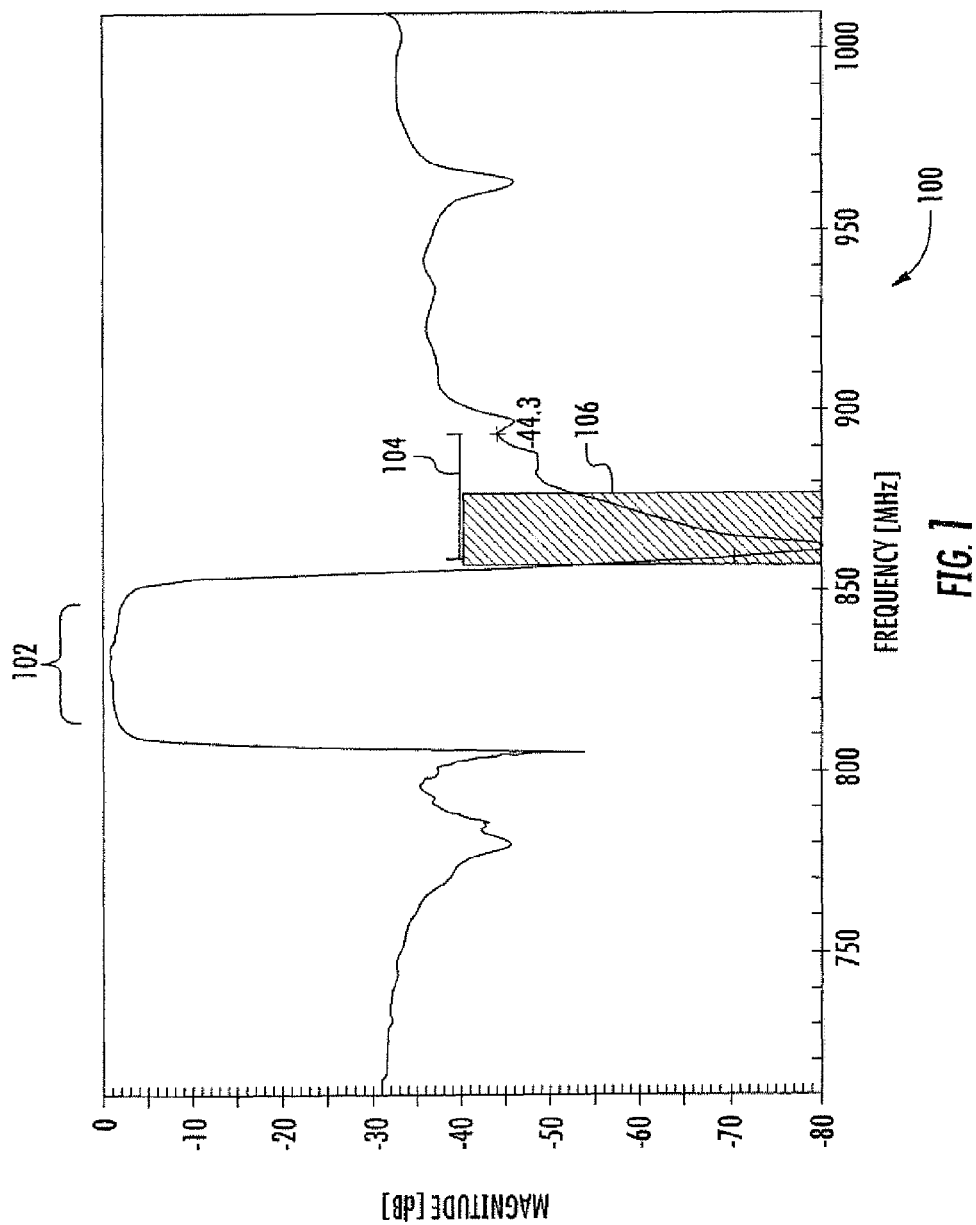
FIG. 1 is one illustrative frequency response for a receiver filter of a victim UE transceiver.

All Figures © Copyright 2012 Apple Inc. All rights reserved.

DETAILED DESCRIPTION

Reference is now made to the drawings, wherein like numerals refer to like parts throughout.

Overview

The present disclosure provides filter and filter component design and selection that consider the minimum performance requirements against overall device cost, and provide a desirable or optimized balance thereof.

Accordingly, in one exemplary embodiment, "intelligent" selection of one or more metric(s) for filter performance is utilized to provide the aforesaid optimized balance of performance and cost considerations. Specifically, rather than evaluating filters based on a worst case performance, one implementation evaluates filters and/or filter components based on an average performance over a range of frequencies (e.g., a frequency linear average metric).

The frequency-linear-average metric more accurately represents reception/transmission performance. By providing more accurate representation of the reception/transmission performance, both network and device optimizations can aggressively manage available power, and utilize enhanced frequency management.

DETAILED DESCRIPTION OF EXEMPLARY EMBODIMENTS

Exemplary embodiments are now described in detail. While these embodiments are primarily discussed in the context of exemplary Long Term Evolution (LTE, or LTE-Advanced) wireless networks and operation, such as those set forth in 3$^{rd}$ Generation Partnership Project (3GPP) Long Term Evolution (LTE) Release 11 and related standards, incorporated herein by reference in its entirety, it will be recognized by those of ordinary skill given this disclosure that the principles discussed herein are not so limited. In fact, the various disclosed features are useful in and readily adapted to any type of wireless or wired radio frequency (RF) system or application that can benefit from intelligent filter design, selection, and/or characterization, as described herein.

Moreover, while exemplary embodiments are described primarily in terms of band-pass filters, it will be readily appreciated that disclosure is in no way so limited, and in fact may be applied to a variety different filter types including without limitation band-stop filters, notch filters, low-pass filters, high-pass filters, etc.

As a brief aside, existing schemes for measuring filter performance are based on a worst case filter performance across a range of frequencies and temperature. Traditionally, worst case filter metrics were used to guarantee network performance. Specifically, interfering network coexistence specifications etc. are derived based on minimum transceiver requirements (such as worst case filter performance). However, as wireless technologies have evolved and frequency spectrum has become increasingly crowded, the conservative approach of using assumed minimum transceiver requirements are too conservative, which yield poor network link performance due to over-specifying adjacent interfering network coexistence parameters such as A-MPR (Additional Minimum Power Reduction) performance.

In general, a worst-case filter metric does not represent the overall filter performance. Thus, existing radio transceivers are "over-designed", and more expensive to manufacture, than is necessary for operation. Moreover, network management techniques (and to some degree construction) are based on worst case filter performance, which results in overly conservative spectral usage. Such overly conservative spectral usage in effect wastes spectrum (which is at a great premium to begin with), since some of the spectrum that could otherwise be exploited is lost and rendered unusable (i.e., no other device or system can "carve out" that wasted portion of spectrum and make any practical use of it). By providing more realistic filter performance metrics, network management entities can aggressively optimize network resources, and devices can reduce their cost (due to reduced component costs and less stringent design requirements).

Accordingly, in one exemplary embodiment a different metric for filter performance is described. Specifically, rather than evaluating filters based on a worst case performance, filters are evaluated based on the actual measured performance averaged over a range of frequencies. For example, in the context of the $3^{rd}$ Generation Partnership Project (3GPP) Long Term Evolution (LTE) standardization, filter performance can be characterized according to a frequency-linear-average metric. The frequency-linear-average metric more accurately represents reception/transmission performance. By providing more accurate representation of the reception/transmission performance both network and device optimizations can aggressively manage available power and handle smaller (tighter) margins.

Example Operation—

Referring now to FIG. 1, one illustrative frequency response 100 for a receive filter of a "victim" UE transceiver is graphically illustrated. As used herein, the "victim" UE is a UE that experiences reception interference due to an "aggressor" UE's transmission. As further shown the frequency response is expressed as a magnitude (measured according to the decibel logarithmic scale (dB)) as a function of frequency. The "pass band" 102 of the filter is the frequency band where the magnitude of attenuation is very close to 0 dB (i.e., almost no attenuation); for areas outside of the pass band (also known as the "rejection bands") the attenuation is −30 dB or more (−30 dB is equivalent to an attenuation factor of 1000; i.e., the attenuated signal is $\frac{1}{1000}^{th}$). The illustrated frequency response has a particular pass band frequency and width, however it is appreciated that during operation the pass band frequency may be dynamically changed (or "tuned") in both location and width.

As illustrated, a range bar 104 is shown adjacent to the pass band 102 of this receive filter of the victim UE transceiver. The range bar represents a region for another transceiver's pass band. The spacing between pass bands of different transceivers is affected by multiple factors (described herein) including, without limitation temperature, and filter quality/construction/materials. While only one range bar 104 is shown, it is appreciated that during normal operation, pass bands for other transceivers may be located on either side of a transceiver's pass band.

The "sharpness" of the pass band 102 (or "roll off") determines the minimum spacing allowed between two transceivers. For example, the sharper the roll off, the closer another transceiver's pass band can be used with respect to the pass band of the first transceiver. The network maintains a minimum spacing between transceivers to ensure that each transceiver is sufficiently isolated from other transceivers. Without appropriate isolation, significant portions of the transmissions from one transceiver will "leak" into the pass band of a neighboring transceiver. However, since each spacing cannot be used for transmission or reception, spacing must be minimized to optimize overall network performance (i.e., optimize spectral usage).

Moreover, certain environmental effects adversely affect spacing. For example, the pass band 102 of a transceiver can "shift" based on temperature. Most transceiver designs are rated to operate only within a certain temperature range; e.g., −25 C to +55 C. As the temperature increases, the pass band may shift up or down in frequency. This shift over the range of acceptable temperatures must be considered in determining spacing.

Traditionally, the guaranteed filter minimum skirt rejection performance across a range of frequency and temperature conditions is used to specify so-called Additional Maximum Power Reduction (A-MPR) requirements. The A-MPR parameter is used to indicate the relative efficacy of the rejection band of a filter. Within the exemplary context of 3GPP LTE Releases, the A-MPR is based on the worst case value for the frequency response. For example, in the receiver filter associated with the plot of FIG. 1, the guaranteed out-of-band rejection is 40 dB. This represents the worst case filter performance that can be expected within the range bars. However, the shaded region 106 of FIG. 1, illustrates the actual rejection isolation for the adjacent 20 MHz channel width. The 40 dB of attenuation is clearly overly conservative.

Thus, in one exemplary embodiment, instead of basing filter metrics on the worst rejection point in the frequency domain, filter metrics are specified based on a more comprehensive metric of filter performance of one or more bands of interest. Specifically, in one embodiment, A-MPR requirements for a cellular network are based on the linear average of actual filter rejection performance at various frequency points across the adjacent channel deployment. Even though out-of-band rejection can vary significantly based on different filter design topologies (in particular, parasitic cross-coupling effects in filter design and packaging can be difficult or impossible to predict or control), out-of-band rejection will generally be much better than the minimum specified rejection value at one worst case frequency point.

Referring back to FIG. 1, the minimum rejection of the frequency response within the adjacent 20 MHz channel would be 40 dB, according to legacy worst-case analysis schemes. However, the average rejection performance across the adjacent 20 MHz channel is significantly better. In fact the filter exhibits better than 50 dB rejection within 90% of the adjacent 20 MHz channel. Accordingly, in one exemplary embodiment a linear average is calculated based on filter rejection over a range of points. For example, the rejection characteristic is calculated for each resource block, and summed linearly (typically rejection is measured in decibels, however for a linear average the decibels are converted to a linear value).

By altering the calculation metric for the duplexing filter, a more accurate representation of filter performance can be determined. TABLE 1 provides the worst case rejection and frequency linear average rejection for the exemplary frequency response curve of FIG. 1, according to different selected widths (20 MHz, 10 MHz, 5 MHz, 1 resource block (RB) which is equivalent to 0.2 MHz).

TABLE 1

| Rejection Magnitude (dB) | 20 MHz channel | 10 MHz channel | 5 MHz channel | 1 RB |
| --- | --- | --- | --- | --- |
| Minimum Spec | −40 dB | −40 dB | −40 dB | −40 dB |
| Frequency linear average | −51.4 dB | −51.9 dB | −51.9 dB | −40 dB |

As illustrated in TABLE 1, the duplexing filter associated with FIG. 1 has nearly 11 dB of additional performance over the 20 MHz, 10 MHz, and 5 MHz channel bandwidths. In the foregoing scheme there is no impact on the single RB scenario, as the measurement granularity is based on RBs (i.e., the average rejection value of a single RB is the rejection value of the RB).

According to traditional metrics, a sizable margin of isolation (11 dB) was left untouched; however with the linear average metric of the present embodiment, this margin can advantageously be used by both the device and network to aggressively improve operation. Moreover, the foregoing calculations can be performed to accommodate changes in temperature performance of the filters. It is appreciated that different conditions (e.g., variations in temperatures) may change the degree of improvement.

In some implementations, the exemplary dynamically determined actual frequency linear average rejection filter metric may be compared to worst case filter rejection specification (e.g., −40 dB). When the linear averaged metric provides an improvement over the worst-case filter metrics, the dynamically determined actual metric may be used. When the linear averaged metric is worse than the worst-case filter metric, the standard worst-case may be used.

Methods—

Figure 2:
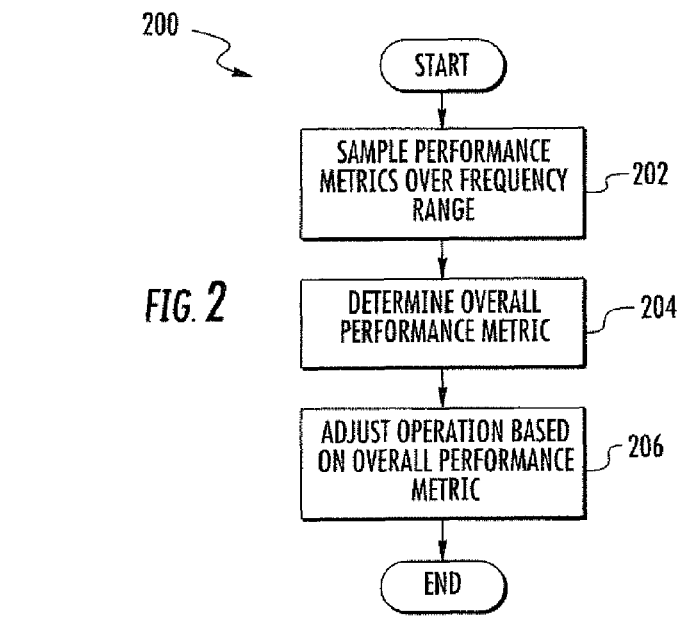
FIG. 2 is a logical flow diagram illustrating one embodiment of a generalized method for improving device performance based on component (e.g., filter) characteristics.

Referring now to FIG. 2, one embodiment of a generalized method 200 for improving device performance based on filter characteristics is shown and described.

At step 202 of the method 200, one or more performance metrics for a filter are sampled across one or more frequency ranges. In one embodiment the performance metric(s) is/are selected to be the degree of rejection over a subcarrier. Within the exemplary context of 3GPP LTE, the rejection is measured over each resource block (RB) (which is 0.2 MHz) over a channel bandwidth (e.g., 1.4 MHz, 3 MHz, 5 MHz, 10 MHz, 15 MHz, 20 MHz, etc.), although it will readily be appreciated by those of ordinary skill given this disclosure that other metrics and/or channel bandwidths may be used.

In some embodiments, the performance metric(s) can be related to any one or more of (without limitation): (i) a degree of distortion, (ii) a degree of noise, and/or (iii) a flatness of the filter.

In one embodiment, the performance metrics are sampled statically, or semi-statically. For example, manufacturing facilities may be outfitted with spectrum analysis equipment useful for determining an amount of rejection provided by a filter. In some embodiments, a device housing the filter itself may be configured to perform self tests, based on e.g., a test program or periodic calibration. In still other embodiments, a device may be configured to dynamically determine a filter's rejection characteristics based on a test mode. In yet other embodiments, a filter minimum rejection specification can specify the filter rejection at each frequency point of interest instead of a single common rejection value for all frequency points of interest, etc.

Furthermore, performance metrics can be determined on a statistical, sampling, or anecdotal basis. For example, in one variant, a random sampling of manufactured components is evaluated. Alternatively, each component manufactured can be evaluated. As yet another embodiment, a sampling of the general population of components can be evaluated, and the results from the most limiting cases used as the basis for determination of an appropriate metric.

In still other embodiments, the performance metrics may be sampled by a device external to (but in communication with) the filter device. For example, in certain wireless networks, a peer device (in an ad hoc network) or a serving device (e.g., a base station (BS)) may be able to identify (e.g., based on leakage, power, etc.) or calculate the performance metrics.

At step 204 of the method 200, an overall performance metric for the filter is determined. In one embodiment, the performance metric is based on rejection loss. In other embodiments, the performance metric is a noise figure. In still other embodiments, the performance metric is a degree of distortion. In yet other embodiments, the performance metric is a degree of amplification.

In one exemplary embodiment, the overall performance metric is a linear average of one or more rejection losses. In some embodiments, the overall performance metric may be a weighted average; e.g., with portions of the spectrum of interest weighted more heavily than others. This weighting may be static in nature, or even dynamically applied depending on; e.g., operating conditions of the filter or example. For instance, it may be that a first weighting is applicable/optimal for a first operating condition such as temperature, while a second weighting is more optimal for another.

In yet further embodiments, the overall performance metric may be further subdivided into one or more areas of interest. In still other embodiments, the overall performance metric is rated as a performance relative to an absolute or ideal performance. For example, an overall performance metric may be an average degree of loss measured in decibels (dB) over a particular frequency bandwidth. In another such example, the overall performance metric may be expressed as a percentage of loss.

In still other embodiments, the performance metric may have multiple components; for example, the performance metric may include information such as a mean value, standard deviation value, and/or median value, or yet other relevant statistical criteria (e.g., least-squares information regarding best fit of linear function).

The performance metric may further include information such as a characteristic equation (or approximation thereof). For example, rejection loss may be modeled as a simple function (e.g., linear or exponential approximation as a function of frequency).

In still other embodiments, the performance metric may be selected from one or more pre-defined performance profiles. Examples of such embodiments may be based on e.g., a codebook or other shared reference.

At step 206 of the method 200, one or more device functions are adjusted based on the overall performance metric of the filter. In one exemplary embodiment, a user equipment changes operation of a duplexing filter so as to more aggressively transmit power based on e.g., the overall filter performance for an overall transmission bandwidth. For example, in one variant, a device (e.g., mobile device) may be pre-loaded with transmission settings based on one or manufacturing tests performed to analyze overall filter performance for different transmission bandwidths. In another variant, the device may configure itself to transmit at appropriate power levels based on one or more self-calibration tests. In still other variants, a device may configure itself to transmit at appropriate power levels based on dynamic input, where the dynamic input is indicative of the overall filter performance. Common examples of dynamic input may include for example: actual rejection measurements, transmission bandwidth, etc.)

In still other embodiments, a device may be pre-loaded with reception settings based on one or more manufacturing tests. Similarly, the device may adjust reception gain according to one or more overall filter reception characteristics. In certain variants, the device may be pre-loaded, self-calibrate, or dynamically determine overall reception filter characteristics.

In another embodiment, a serving station (e.g., base station (BS)) determines one or more network allocations based on the overall performance metric of the filter. For example, in one exemplary embodiment, a base station determines the spacing between frequency allocations based on the: (i) overall performance metric of one or more device filters, and (ii) a transmission or reception bandwidth. In some embodiments, the serving station may report the overall filter metric to the device. In some embodiments, the serving station may receive information regarding the overall filter performance metrics for one or more devices.

It will also be readily recognized by ones of ordinary skill in the related arts (when given the present disclosure) that other device functionality and network configurations are possible.

Exemplary User Equipment (UE) Apparatus—

Figure 3:
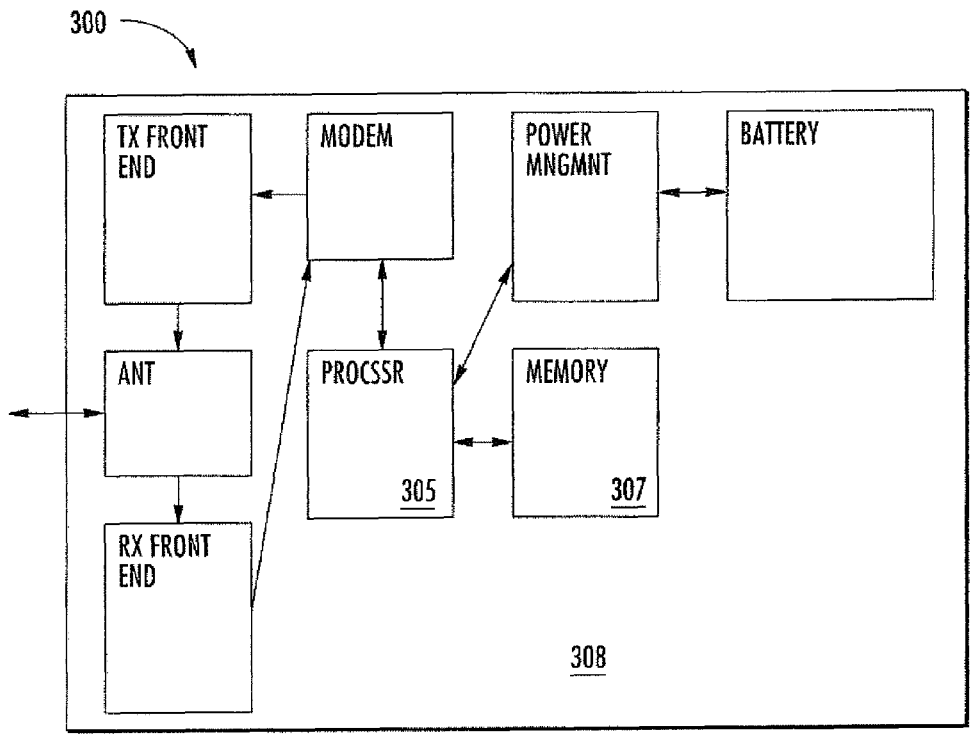
FIG. 3 is a functional block diagram illustrating one embodiment of a user radio frequency device configured in accordance with the principles disclosed hereinafter.

Referring now to FIG. 3, exemplary client or UE apparatus 300 useful in implementing the disclosed methods is illustrated. As used herein, the terms "client" and "UE" include, but are not limited to wireless-enabled cellular telephones, smartphones (such as for example an iPhone™), wireless enabled personal computers (PCs), such as for example an iMac™, Mac Pro™, Mac Mini™ or MacBook™, and minicomputers, whether desktop, laptop, or otherwise, as well as mobile devices such as handheld computers, PDAs, personal media devices (PMDs), or any combinations of the foregoing. The configuration and usage of overall filter performance is preferably performed in software, although firmware and/or hardware embodiments are also envisioned; this apparatus is described subsequently herein with respect to FIG. 3.

The UE apparatus 300 of FIG. 3 includes a radio modem or transceiver, a processing subsystem 305 such as a digital signal processor, microprocessor, field-programmable gate array, or plurality of processing components mounted on one or more substrates 308. The radio modem or wireless transceiver (e.g., LTE or other device capable of utilizing radio frequency signals) includes the aforementioned filter(s). The processing subsystem may also include an internal cache memory. The processing subsystem 305 is connected to a memory subsystem 307 including memory which may for example, include SRAM, flash and SDRAM components. The memory subsystem may implement one or a more of DMA type hardware, so as to facilitate data accesses as is well known in the art. In the illustrated embodiment, the processing subsystem additionally includes subsystems or modules for determining an overall filter characteristic performance, and configuring operation thereto. These subsystems may be implemented in software or hardware which is coupled to the processing subsystem. Alternatively, in another variant, the subsystems may be directly coupled to the digital baseband.

The processing subsystem 305 may implement logic configured to adaptively configure one or more filter parameters in accordance with any of the applicable methodologies described supra. In one embodiment, the adaptation may include sampling of a performance metric values over a frequency range and determination of overall performance metric based on the sampled values. Based on a comparison between actual performance metric with a target value (e.g., minimal acceptable stop band rejection) the one or more filter parameter (e.g., bandwidth and/or power) may be adjusted, Exemplary Base Station (BS) Apparatus—

Figure 4:
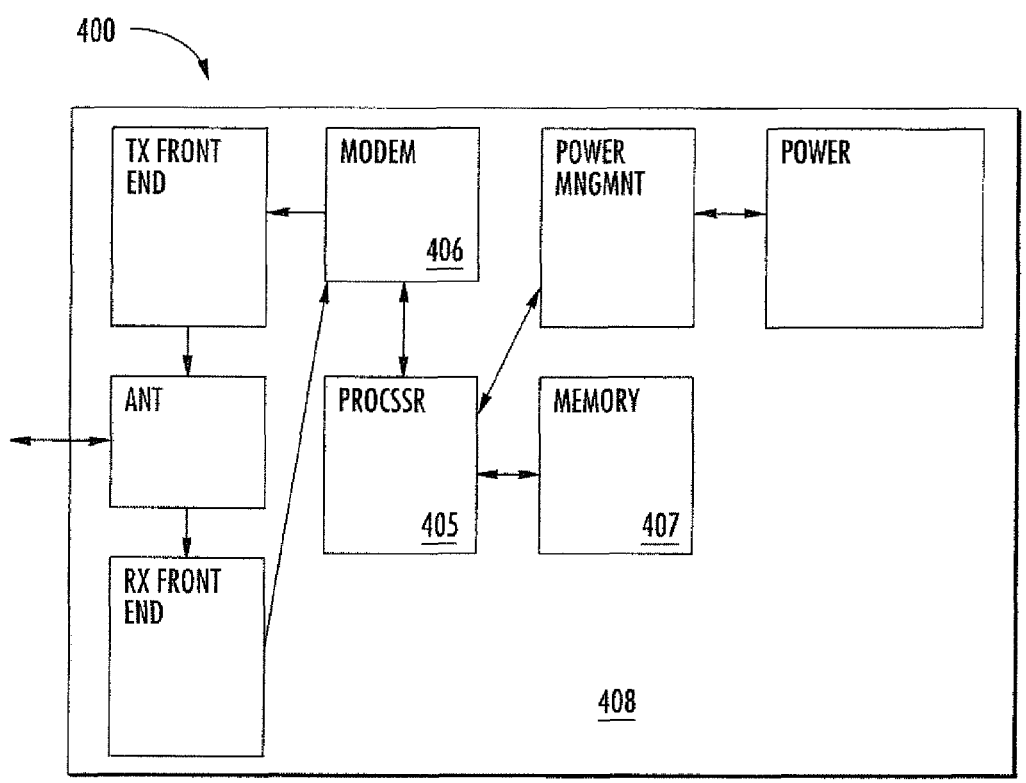
FIG. 4 is a functional block diagram illustrating one embodiment of a radio frequency serving device (e.g., base station) configured in accordance with the .principles disclosed hereinafter.

Referring now to FIG. 4, exemplary server or base station (BS) apparatus 400 useful in implementing the disclosed methods is illustrated. As used herein, the terms "server" and "BS" include, but are not limited to base stations (e.g., NodeB, eNodeB, etc.), access points, relay stations, etc. The configuration of network management based on overall filter performance characteristics are preferably performed in software, although firmware and/or hardware embodiments are also envisioned; this apparatus is described subsequently herein with respect to FIG. 4.

The BS apparatus 400 of FIG. 4 includes a wireless modem or transceiver (with one or more filters), a processing subsystem 405 such as a digital signal processor, microprocessor, field-programmable gate array, application-specific integrated circuit, and/or a plurality of processing components mounted on one or more substrates 408. The processing subsystem may also include an internal cache memory. The processing subsystem 405 is connected to a memory subsystem 407 including memory which may for example, include SRAM, flash and SDRAM components. The memory subsystem may implement one or a more of DMA type hardware, so as to facilitate data accesses as is well known in the art. In the illustrated embodiment, the processing subsystem additionally includes subsystems or modules for implementing the various schemes for network management as described previously herein. These subsystems may be implemented in software or hardware which is coupled to the processing subsystem. In another variant, the subsystems may be directly coupled to the digital baseband.

The processing subsystem 405 may implement logic configured to enable a more efficient network bandwidth utilization by two or more UE devices. In one embodiment, the more efficient bandwidth utilization can be effectuated by causing first UE device to transmit a test signal over at least a portion of the bandwidth, and causing second UE device to evaluate a bandwidth parameter (e.g., transceiver pass-band isolation between the first and the second devices). When a margin of isolation is available, the first and/or the second UE may be configured to utilize a greater portion of the network bandwidth (e.g., by using higher transmit power and/or transmit/receive bandwidth) compared to the UE operation based on the worst-case metric, as described in detail above.

It will be recognized that while certain embodiments of the disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from the contents of the disclosure. The foregoing description is of the best mode presently contemplated. This description is in no way meant to be limiting, but rather should be taken as illustrative of the general principles embodied herein. The scope of the present disclosure should be determined with reference to the claims.

What is claimed is:

1. A method for adaptively managing a component of a mobile wireless device, the method comprising:
   characterizing one or more performance metrics of one or more radio frequency filter components within a frequency band, wherein:
      the frequency band comprises a plurality of frequency bins; and
      individual ones of the one or more performance metrics are associated with respective individual ones of the plurality of frequency bins;
   determining a combined performance metric based at least in part on the characterized one or more performance metrics; and
   adjusting a transmit power based on the combined performance metric.

2. The method of claim 1, wherein:
   the determining the combined performance metric comprises determining a weighted average of the one or more performance metrics; and
   the weighted average is based on a plurality of static weights.

3. The method of claim 2, wherein the characterizing of the one or more performance metrics is additionally performed over a temperature range.

4. The method of claim 1, wherein the one or more performance metrics comprise an efficacy of the one or more radio frequency filter components to reject unwanted frequencies.

5. The method of claim 4, wherein the efficacy is determined based at least in part on one or more of: (i) insertion loss; (ii) stop bandwidth; (iii) roll-off steepness; and (iv) stop band rejection.

6. The method of claim 4, wherein individual ones of the one or more performance metrics comprise out-of-band rejection values associated with respective individual ones of the plurality of frequency bins.

7. The method of claim 1, wherein the characterizing the one or more performance metrics comprises:
   determining a temperature of a transceiver of the mobile wireless device; and
   determining a shift of a filter bandwidth parameter associated with the temperature.

8. The method of claim 1, wherein the combined performance metric comprises a frequency linear average out-of-band rejection.

9. The method of claim 1, wherein one or more performance metrics comprise one or more of (i) filter stop band rejection, (ii) transmit power; and/or (iii) filter bandwidth.

10. The method of claim 1, wherein the combined performance metric comprises any of (i) an average level of power loss measured over the frequency band, or (ii) a percentage of power loss.

11. The method of claim 1, wherein the combined performance metric is based at least in part on one or more statistical parameters selected from the group consisting of: (i) a mean value; (ii) a standard deviation value; (iii) a median value; (iv) a percentile value; and (v) a least-squares regression coefficient.

12. A wireless device comprising:
   processing apparatus;
   a wireless transceiver in communication with the processing apparatus; and
   a computer readable apparatus in communication with the processing apparatus and having a plurality of computer readable instructions stored thereon, the instructions configured to, when executed on the processing apparatus, cause the processing apparatus to:
      characterize one or more performance metrics of one or more radio frequency filter components within a frequency band, wherein:
         the frequency band comprises a plurality of frequency bins; and
         individual ones of the one or more performance metrics are associated with respective individual ones of the plurality of frequency bins;
      determine a combined performance metric based at least in part on the characterized one or more performance metrics; and
      adjust a transmit power based on the combined performance metric.

13. The wireless device of claim 12, wherein:
   the determined combined performance metric comprises determining a weighted average of the one or more performance metrics; and
   the weighted average is based on a plurality of static weights.

14. The wireless device of claim 13, wherein the characterized one or more performance metrics is additionally performed over a temperature range.

15. The wireless device of claim 12, wherein the characterized one or more performance metrics comprise an efficacy of the one or more radio frequency filter components to reject unwanted frequencies.

16. The wireless device of claim 15, wherein the efficacy is determined based at least in part on one or more of: (i) insertion loss; (ii) stop bandwidth; (iii) roll-off steepness; and (iv) stop band rejection.

17. The wireless device of claim 15, wherein individual ones of the one or more performance metrics comprise out-of-band rejection values associated with respective individual ones of the plurality of frequency bins.

18. The wireless device of claim 12, wherein the characterized one or more performance metrics comprises a temperature of the wireless transceiver of the mobile wireless device and a shift of a filter bandwidth parameter associated with the temperature.

19. The wireless device of claim 12, wherein the combined performance metric comprises a frequency linear average out-of-band rejection.

20. The wireless device of claim 12, wherein characterized one or more performance metrics comprise one or more of (i) filter stop band rejection, (ii) transmit power; and/or (iii) filter bandwidth.

21. The wireless device of claim 12, wherein the determined combined performance metric comprises any of (i) an average level of power loss measured over the frequency band, or (ii) a percentage of power loss.

22. The wireless device of claim 12, wherein the determined combined performance metric is based at least in part on one or more statistical parameters selected from the group consisting of: (i) a mean value; (ii) a standard deviation value; (iii) a median value; (iv) a percentile value; and (v) a least-squares regression coefficient.

* * * * *